United States Patent
Nagashima

[19]

[11] Patent Number: 5,898,741
[45] Date of Patent: Apr. 27, 1999

[54] DELAYED DETECTION MRC DIVERSITY CIRCUIT

[75] Inventor: Katsuya Nagashima, Saitama, Japan

[73] Assignee: NEC Corporation, Tokyo, Japan

[21] Appl. No.: 08/879,232

[22] Filed: Jun. 19, 1997

[30] Foreign Application Priority Data

Jun. 20, 1996 [JP] Japan ................................. 8-178733

[51] Int. Cl.$^6$ .................................................. H04B 7/08
[52] U.S. Cl. ...................... 375/347; 375/267; 375/349; 455/134; 455/226.1
[58] Field of Search ................................. 375/266, 267, 375/343, 340, 347, 348, 349, 375; 455/134, 150.1, 154.1, 158.3, 161.3, 226.1, 226.2

[56] References Cited

U.S. PATENT DOCUMENTS

| | | | |
|---|---|---|---|
| 5,280,637 | 1/1994 | Larosa et al. ........................... | 455/134 |
| 5,488,638 | 1/1996 | Kazecki et al. ......................... | 375/347 |
| 5,586,148 | 12/1996 | Fukukawa et al. ..................... | 375/340 |
| 5,696,798 | 12/1997 | Wright et al. .......................... | 375/345 |

FOREIGN PATENT DOCUMENTS 4-150320  5/1992  Japan.

*Primary Examiner*—Jason Chan
*Assistant Examiner*—Conguan Tran
*Attorney, Agent, or Firm*—Sughrue, Mion, Zinn, Macpeak & Seas, PLLC

[57] ABSTRACT

A delayed detection MRC diversity circuit which does not adjust synchronization in every reception branch independently having a simple circuit constitution and superior receiving characteristics. The delayed detection MRC diversity circuit is composed of a comparison circuit for selecting a reception branch with maximum RSSI, a selector, a base band circuit such as synchronous circuit and so forth for generating a regenerative clock while adjusting bit-synchronization in terms of the reception branch with the maximum RSSI, and a MRC diversity circuit section for composing using the regenerative clock.

8 Claims, 5 Drawing Sheets

DELAYED DETECTION MRC DIVERSITY CIRCUIT

BACKGROUND OF THE INVENTION

The present invention relates to a delayed detection maximum ratio composition (hereinafter referring to MRC) diversity circuit for use in a mobile radio base station and so forth.

DESCRIPTION OF THE PRIOR ART

There exist various kinds of MRC diversity circuits. The conventional circuit of this kind is shown in FIG. 1 (hereinafter referring to the first prior art).

The MRC diversity circuit employs maximum ratio composition controllers 25 to 28 as a controller for controlling diversity signal. The controller has no compensation function in terms of time base direction. For this reason, multipath difference of received diversity signal is large. There is the problem that when time base diffusion of signal is increased, effective control can not be implemented.

FIG. 2 is a block diagram showing another conventional MRC diversity circuit (hereinafter referring to the second prior art) disclosed in the Japanese Patent Application Laid-Open HEI 4-150320. In FIG. 2, reference numerals 35 to 38 represent adaptive matching filter, reference numeral 39 represents composition unit, and reference numeral 40 represents modulator.

A signal received by an antenna (not illustrated) is subjected to frequency conversion, before being converted into a signal of intermediate frequency band, thus being applied to input terminals 21 to 24 in every diversity. At this section, each signal is divided into two-branched signals. One of two-branched signals is inputted to the adaptive matching filters 35 to 38 which have the constitution of transversal filter, being subjected to required signal processing, before being composed by the composition unit 39. Inter-symbol interference caused by the multipath is removed by the automatic equalizer 30, before being demodulated to be judged by the modulator 31, thus being outputted from the output terminal 32 after coming into base band signal.

On the other hand, individual clock regenerative circuit is composed of maximum ratio composition controllers 25 to 28, composition unit 29, and a clock regenerator 34. The adaptive matching filters 35 to 38 have a constitution of transversal filter, thus correlating diffused signal with reference signal at each tap of the transversal filter. The adaptive matching filters 35 to 38 behave such that each picks up the signal from correlated tap, correction of time base using the adaptive matching filters 35 to 38 is capable of being performed.

In the above described conventional MRC diversity circuit, there is the problem that the MRC diversity circuit has no compensation function in terms of time base direction, thereby multipath difference becomes large so that time base diffusion of signal is increased, thus resulting in impossibility of effective control in the first prior art.

Also, there is the problem that although correction of the time base is implemented using the adaptive matching filter with the constitution of transversal filter, circuit constitution becomes complicated and expensive in the second prior art.

It is necessary to modulate all of the reception branches in case of MRC diversity as is generally known. In this case, the problem how is adjusting bit synchronization. When all of reception branches are provided with respective base band circuit, such as synchronous circuit and so forth, the circuit becomes large-scale, and interface between base band circuits of each system becomes complicated.

Furthermore, as described in the invention of the Japanese Patent Application Laid-Open No. HEI 4-207821, when the sub received signal is composed with the main received signal, such that phase of the sub received signal corresponds with phase of the main received signal with the signals adjusted with each other, there are problems that when receiving field strength (hereinafter referring to RSSI) of the main received signal deteriorates, synchronization achievement becomes difficult.

SUMMARY OF THE INVENTION

In view of the foregoing, it is an object of the present invention to provide a delayed detection MRC diversity circuit which has superior receiving characteristics, such as fading characteristics and so forth, with simple circuit constitution without adjustment of synchronization in every reception branch independently.

According to one aspect of the present invention, for achieving the above-mentioned object, there is provided a delayed detection MRC diversity circuit, which composes a signal received by a plurality of reception branches with required bit synchronous timing to demodulate, comprising means for detecting a reception branch with maximum RSSI, means for regenerating clock while adjusting the signal received by the reception branch, means for composing to demodulate said signal received by said plurality of reception branches with synchronous timing of said clock.

In the delayed detection MRC diversity circuit according to the above aspect, the means for detecting a reception branch with maximum RSSI compares RSSI in every symbol which is received by the plurality of reception branches.

Furthermore, the delayed detection MRC diversity circuit according to the above aspect further comprises means for detecting always a reception branch with maximum RSSI, means for regenerating clock while adjusting the signal received by the reception branch, means for composing to demodulate the signal received by the plurality of reception branches with synchronous timing of the clock, whereby bit synchronization is ensured without another operation.

As described above, the delayed detection MRC diversity circuit according to the invention is capable of adjusting the reception branch of maximum RSSI with timing of bit synchronization. Even if the RSSI of the reception branch which is adjusted with the timing of bit synchronization is weakened by fading or the like, it becomes possible to adjust the bit synchronization properly.

It is proper that only MRC diversity circuit section is connected to all of the reception branches. Consequently, the greater part of base band circuit such as the synchronous circuit and so forth can do with only one circuit for the reception branch with maximum RSSI. The delayed detection MRC diversity circuit with proper receiving characteristic can be realized without enlarging circuit scale.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

Figure 1:
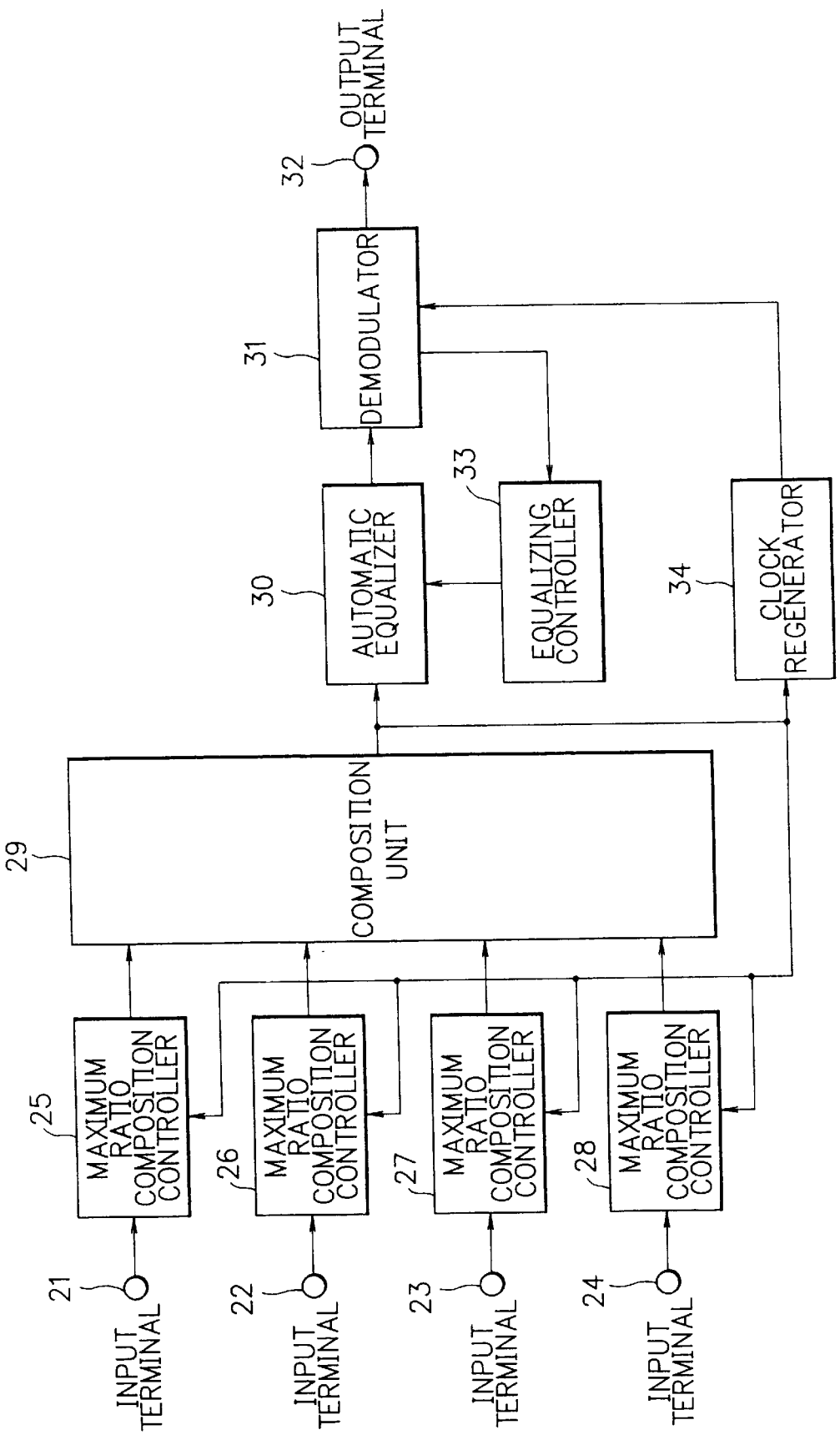
FIG. 1 is a block diagram showing an example of this kind of conventional MRC diversity circuit.
Figure 2:
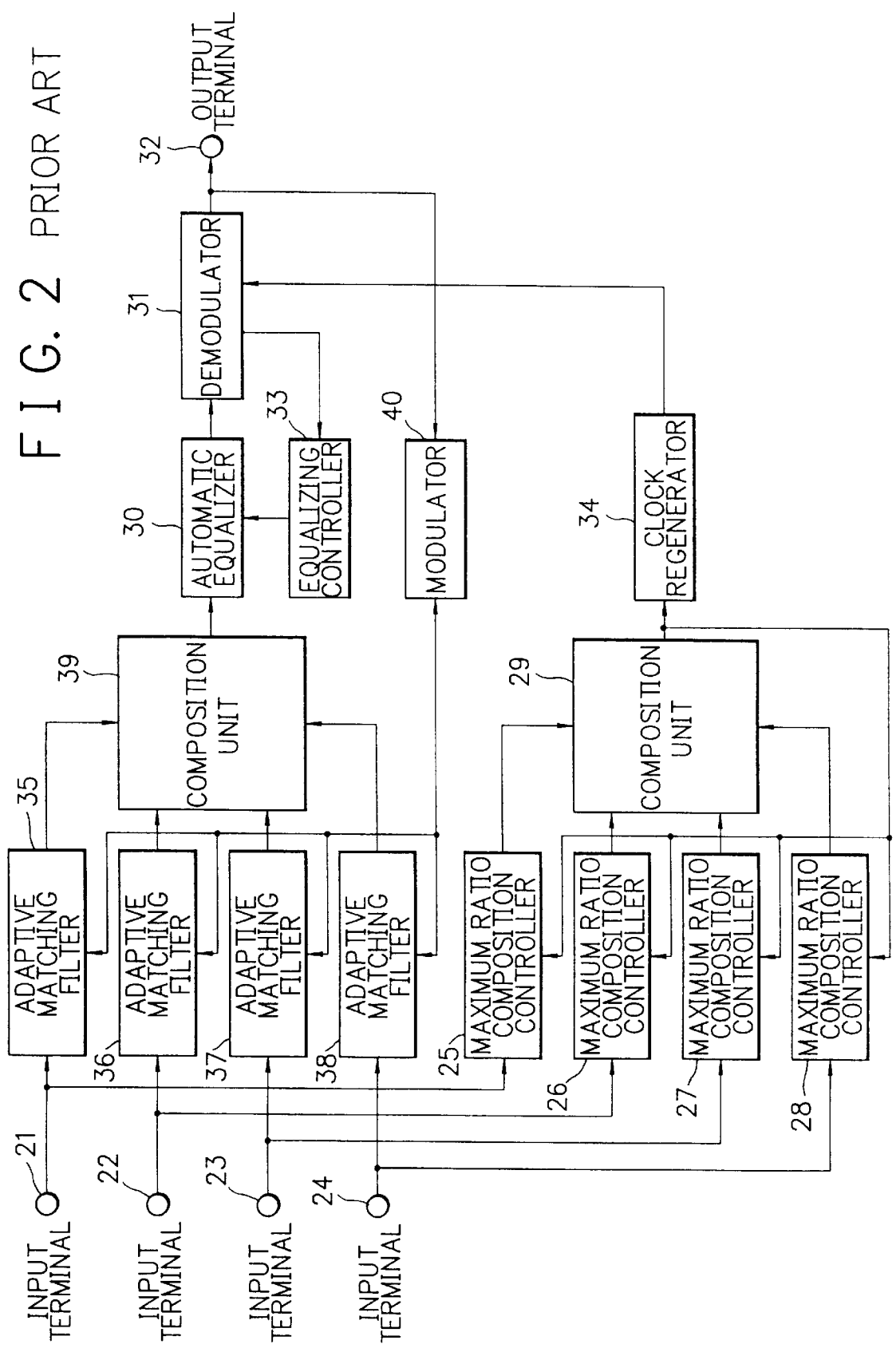
FIG. 2 is a block diagram showing another example of this kind of conventional MRC diversity circuit.
Figure 3:
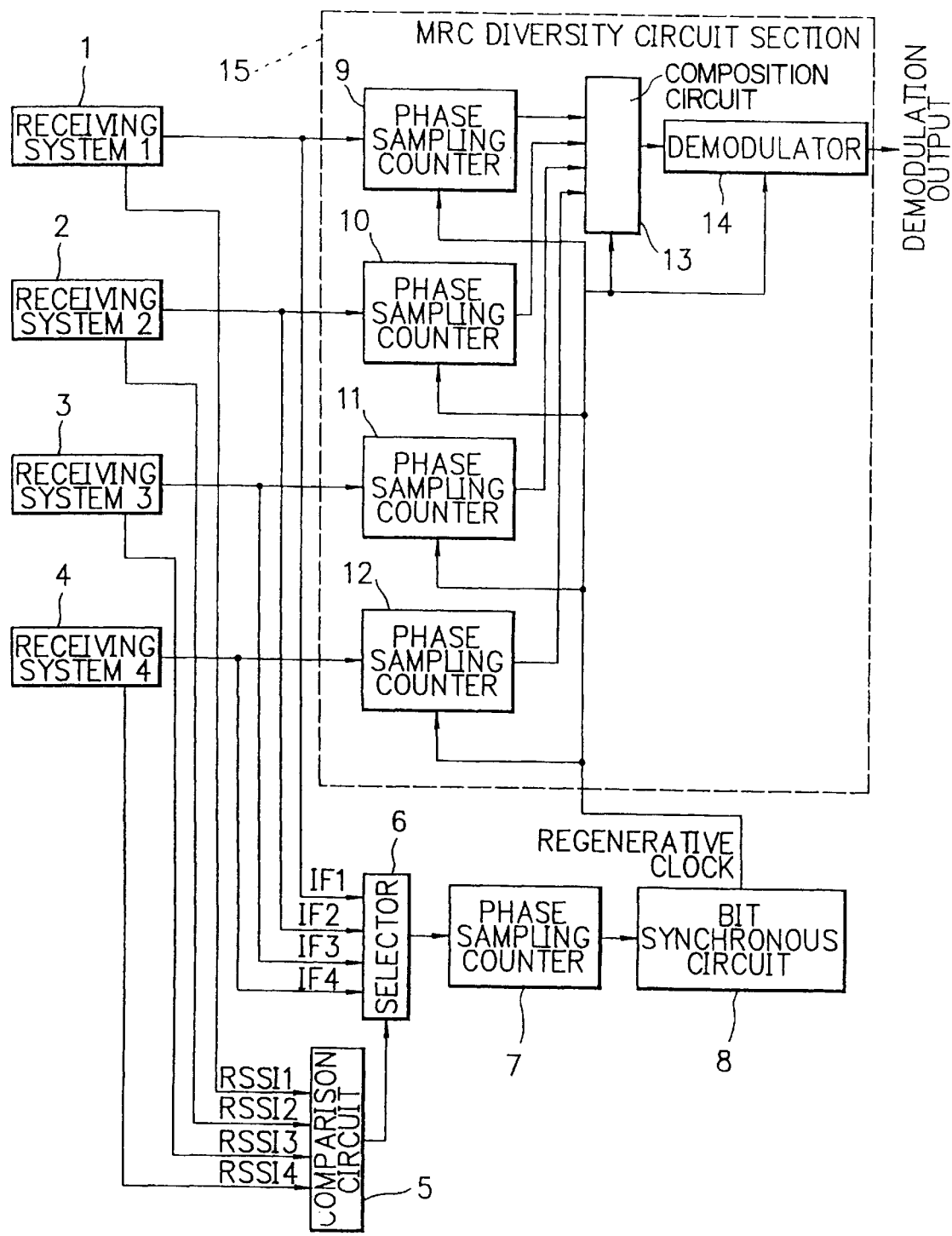
FIG. 3 is a block diagram showing an outline of an embodiment of a delayed detection MRC diversity circuit according to the present invention.

A preferred embodiment of the present invention will now be described in detail referring to the accompanying drawings. FIG. 3 is a block diagram showing an outline of an embodiment of a delayed detection MRC diversity circuit according to the present invention. In FIG. 3, reference numerals 1 to 4 represent individual reception branches each. Diversities with four reception branches are constituted in the embodiment. Reference numeral 5 represents a comparison circuit for selecting a reception branch with maximum RSSI in every symbol while always comparing RSSI of respective reception branches. Reference numeral 6 represents a selector for outputting while selecting only signal of intermediate frequency (IF) band from the reception branch selected by the comparison circuit 5. Reference numeral 7 represents a synchronous phase sampling counter for phase-sampling intermediate frequency (IF) signal outputted from the selector 6. Reference numeral 8 represents a bit synchronous circuit for outputting regenerative clock while adjusting bit synchronous timing with output from the synchronous phase sampling counter.

Furthermore, reference numeral 15 represents a MRC diversity circuit section. The MRC diversity circuit section 15 of this embodiment comprises synchronous phase sampling counters 9 to 12 for phase-sampling signal of intermediate frequency band from the reception branches 1 to 4 respectively, a composition circuit 13 for composing phase value from the phase sampling counter 9 to 12 respectively, and a demodulation circuit 14 for demodulating on the basis of composed phase value. The regenerative clock from the bit synchronous circuit 8 is inputted to each of the phase sampling counters 9 to 12, the composition circuit 13, and the demodulation circuit 14, thus the MRC diversity section 15 operates on the reference of the clock.

Figure 4:
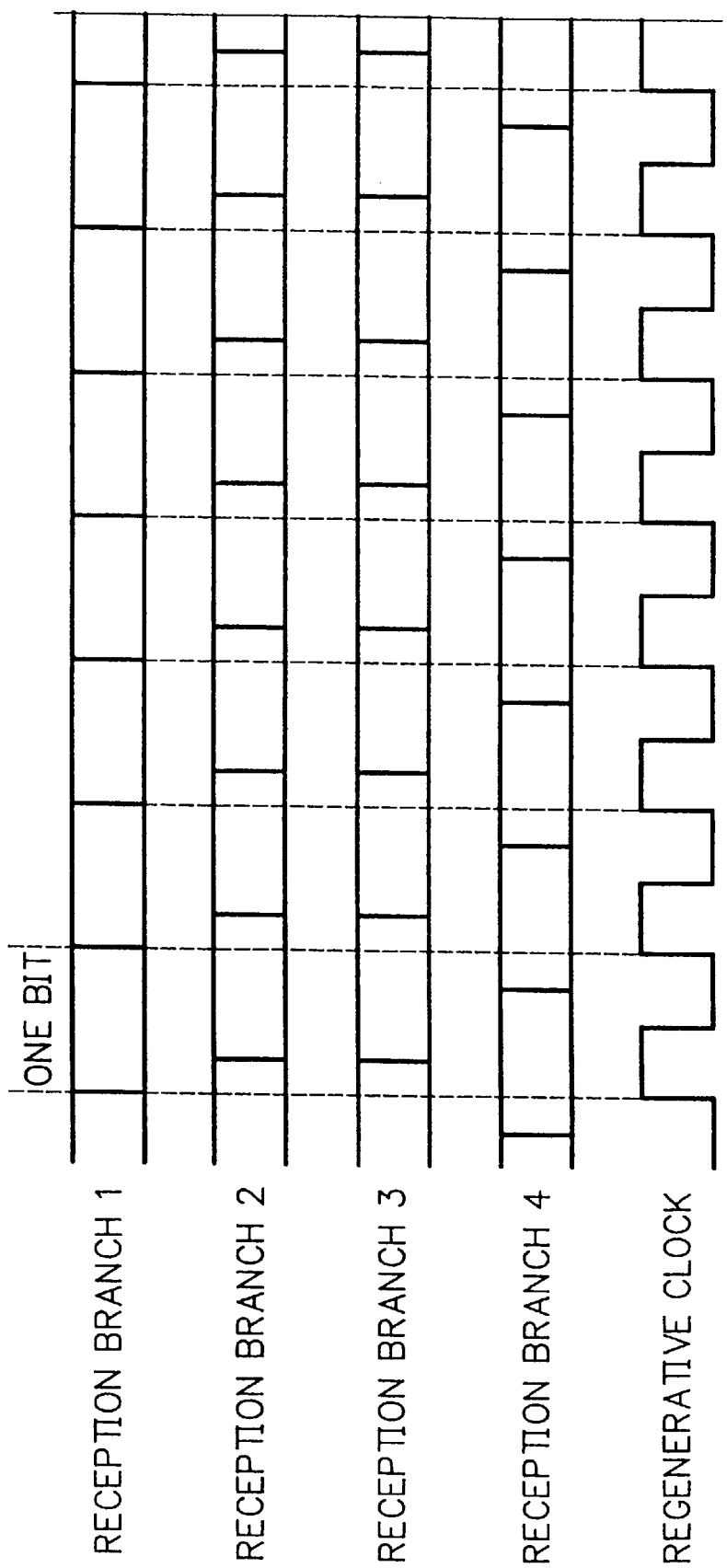
FIG. 4 is a timing chart showing bit synchronous timing between respective reception branches 1 to 4 and regenerative clock.

Next, operation thereof will be described. FIG. 4 is a timing chart showing bit synchronous timing between respective reception branches 1 to 4 and regenerative clock. The comparison circuit 5 always compares RSSI from respective reception branches 1 to 4 with one another in every symbol, thus outputting the information to the selector 6 while always detecting the reception branch with the maximum RSSI. In FIG. 4, the reception branch 1 with maximum RSSI is selected to synchronize.

The selector 6 selects only signal of intermediate frequency band from the reception branch having maximum RSSI in virtue of the information from the comparison circuit 5 to input to the phase sampling counter 7, before adjusting the signal of intermediate frequency band with the bit synchronous timing at the bit synchronous circuit 8, thus outputting the regenerative clock, before inputting the outputted regenerative clock to the MRC diversity circuit section 15. The MRC diversity circuit section 15 implements a phase sampling of signal of the intermediate frequency band from the respective reception branches 1 to 4, a MRC operation, and a demodulating operation to output using the timing of the regenerative clock.

Consequently, it is not necessary to adjust synchronization independently in every reception branch. It is possible to compose the signal of intermediate frequency band into the phase difference information with maximum RSSI and more positive bit-timing. The delayed detection MRC diversity circuit with superior receiving characteristics is obtained.

Figure 5:
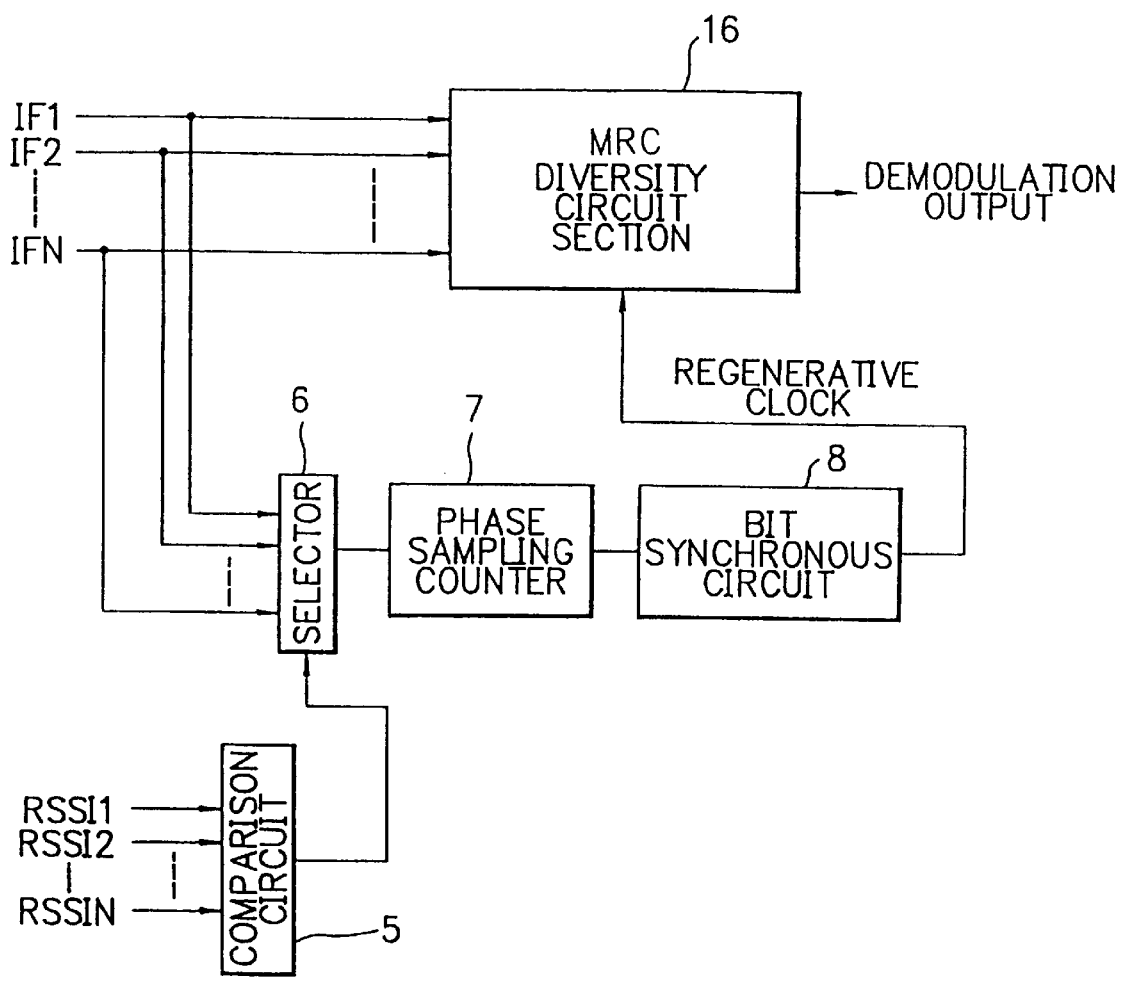
FIG. 5 is a block diagram showing an outline of an another embodiment of a delayed detection MRC diversity circuit according to the present invention.

FIG. 5 is a block diagram showing an outline of another embodiment of a delayed detection MRC diversity circuit according to the present invention. A MRC diversity circuit section 16 comprises N radixes of diversities, a counter, a composition unit and so forth. The MRC diversity circuit section 16 is different from the MRC diversity circuit section 15 which is shown in FIG. 3.

Namely, a delayed detection MRC diversity circuit according to the invention is capable of implementing not only four radixes shown in FIG. 3 but also any number of diversities. The MRC diversity circuit section can be implemented in relation to any circuit which performs this kind of composing operation and demodulating operation with required timing, which does not employ the phase sampling counter.

As described above, according to the invention, the delayed detection MRC diversity circuit has the constitution that it causes timing of bit-synchronization to always adjust to the reception branch with the maximum RSSI. The signal of intermediate frequency band from all of the reception branches always can be converted into the phase difference information with more positive bit-timing to be composed. As a result, the circuit with better receiving characteristics and high reliability can be realized.

Furthermore, it is proper that only MRC diversity circuit section is connected to all of the reception branches. Consequently, the greater part of base band circuit such as the synchronous circuit and so forth can do with only one circuit for the reception branch with maximum receiving electric field intensity even if any number of radixes of diversities exist. There is the effect that simple and inexpensive circuit is capable of being realized.

While preferred embodiments of the invention have been described using specific terms, such description is for illustrative purpose only, and it is to be understood that changes and variations may be made without departing from the spirit or scope of the following claims.

What is claimed is:

1. A delayed detection MRC diversity circuit which composes and demodulates a signal received by a plurality of reception branches, comprising:

means for detecting a reception branch with maximum RSSI;

means for regenerating clock while adjusting said signal received by said reception branch with bit synchronization; and means for composing to demodulate said signal received by said plurality of reception branches with synchronous timing of said clock.

2. A delayed detection MRC diversity circuit according to claim 1, wherein said means for detecting a reception branch with maximum RSSI compares RSSI in every symbol received by said plurality of reception branches.

3. The delayed detection MRC diversity circuit according to claim 1, wherein said means for detecting said reception branch with maximum RSSI includes means for selecting only said reception branch with maximum RSSI, whereby said bit synchronization is performed without another operation.

4. A method of the delayed detection MRC diversity circuit which composes and demodulates a signal received by a plurality of reception branches, comprising the steps of:

detecting a reception branch with maximum RSSI;

regenerating clock while adjusting said signal received by said reception branch with bit synchronization; and composing to demodulate said signal received by said plurality of reception branches with synchronous timing of said clock.

5. A method of the delayed detection MRC diversity circuit according to claim 4, wherein the step for detecting a reception branch with maximum RSSI includes comparing RSSI in every symbol which is received by said plurality of reception branches.

6. The method of the delayed detection MRC diversity circuit according to claim 4, wherein said detecting step includes selecting only said reception branch with maximum RSSI, whereby bit synchronization is performed without another operation.

7. The delayed detection MRC diversity circuit according to claim 1, further comprising:

means for selecting an intermediate frequency signal from said reception branch with maximum RSSI, wherein said means for regenerating clock regenerates said clock while adjusting said intermediate frequency signal with bit synchronization.

8. The method of the delayed detection MRC diversity circuit according to claim 4, further comprising the step of selecting an intermediate frequency signal from said reception branch with maximum RSSI, wherein said regenerating clock step regenerates said clock while adjusting said selected intermediate frequency signal with bit synchronization.

* * * * *